(12) United States Patent
Camp et al.

(10) Patent No.: US 7,670,519 B2
(45) Date of Patent: Mar. 2, 2010

(54) METHOD FOR PRODUCING A GRANULAR MATERIAL AND PRODUCT OBTAINED

(75) Inventors: Jean-Pierre Camp, Paris (FR); Serge Bensaid, Rond-Point de Lançon (FR)

(73) Assignee: Sem Stone, Paris (FR)

( * ) Notice: Subject to any disclaimer, the term of this patent is extended or adjusted under 35 U.S.C. 154(b) by 661 days.

(21) Appl. No.: 10/577,784

(22) PCT Filed: Oct. 15, 2004

(86) PCT No.: PCT/FR2004/002633

§ 371 (c)(1),
(2), (4) Date: Mar. 10, 2007

(87) PCT Pub. No.: WO2005/047214

PCT Pub. Date: May 26, 2005

(65) Prior Publication Data

US 2007/0261605 A1   Nov. 15, 2007

(30) Foreign Application Priority Data

Nov. 6, 2003   (FR) .................................. 03 13035

(51) Int. Cl.
*B29C 67/00* (2006.01)

(52) U.S. Cl. ........................ 264/117; 106/705; 106/716; 427/419.7

(58) Field of Classification Search ................. 106/716, 106/705; 264/117; 427/419.7
See application file for complete search history.

(56) References Cited

U.S. PATENT DOCUMENTS 3,847,806 A * 11/1974 Kuroiwa et al. ............. 210/710

FOREIGN PATENT DOCUMENTS

| EP | 0156244  | 10/1985 |
| EP | 0560423  | 9/1993  |
| EP | 0564857  | 10/1993 |
| JP | 4045899  | 2/1992  |
| JP | 04045899 | 2/1992  |

* cited by examiner

*Primary Examiner*—Paul Marcantoni
(74) *Attorney, Agent, or Firm*—Pearne & Gordon LLP

(57) ABSTRACT

A method for producing a free-flowing granular material includes screening pumice and mixing it with sludge issuing from the biological treatment of municipal or industrial wastewater.

8 Claims, No Drawings

METHOD FOR PRODUCING A GRANULAR MATERIAL AND PRODUCT OBTAINED

The present invention relates to methods for producing a free-flowing granular material and to the products obtained and, more particularly, to production methods utilizing sludge issuing from the biological treatment of municipal and industrial wastewater.

The biological treatment of municipal and industrial wastewater generates large quantities of sludge which have been subject to spreading for many years, and which, since this is now prohibited, are now landfilled.

It is the object of the invention to convert this sludge into a valuable product which can be used particularly as a culture substrate.

The method according to the invention for producing free-flowing granular material is characterized in that pumice is screened to obtain pumice with a size of greater than 500 microns and less than 15 mm. The screened pumice is contacted with at least 20% of its weight of water with stirring, the purified pumice is then separated from the water and dried. One part by weight of sludge issuing from the biological treatment of municipal or industrial wastewater is mixed with 0.5 to 0.9 part by weight of dried pumice until granules are obtained.

Thanks to the presence of open pore pumice and as shown by the analytical composition of the treated sludge and the mineralization kinetics test results, and also vegetation mud tests, the sludges are stablized, most of the organic nitrogen in the sludge is temporarily immobilized and, in consequence, the danger of leaching out the soluble forms of nitrogen (particularly the ammoniacal form) are severely limited. The effects obtained are similar to those procured by composting the sludge, but the treatment according to the invention takes place immediately, whereas composting demands several months. The slower mineralization of the nitrogen obviously reduces the fertilizing value of the sludge thus treated. On the other hand, however, the physical properties of the sludge have the effect of significantly improving the water retention capacity and the physical structure of the soil in which it is incorporated. The pumice of the invention is capable of absorbing about 40 to 60 liters of water per $m^3$ of the combination of pumice and sludge. It can therefore directly retain sludge containing 75 to 90% by volume of water. It is no longer necessary to heat treat this sludge, or it suffices to concentrate it more or less, whereas the product of DE-A-15 62 44, in which the basalt and fines are not removed by washing, cannot absorb more than 290 liters of water per $m^3$, according to the tests performed by the applicants. Similarly, the experiment conducted with sludge containing 13% of dry product and pumice fines between 100 and 500 microns reveals an aggregation of the dry mortar type that jeopardizes or even prevents the desired granulation.

The first stage of the method of the invention consists in screening pumice to obtain grains with a size above 500 microns and lower than or equal to 15 mm.

The second stage of the method of the invention consists in placing the pumice in the presence of water. The pumice is placed in the presence of at least 20% by weight of water with stirring. This stage is essentially designed to rid the pumice of the fines, basalt, magnetite and volcanic ash, which block the pores. A particularly preferred method for performing this washing with separation of the undesirable substances consists in spraying water jets through a screen on which the pumice is deposited. The jets lift the pumice grains, penetrate into the pores, rid them of the impurities which fall and pass through the screen, so that the clean pumice is separated. This pumice is then dried in a dryer, for example, in a hot air flow dryer, for example between 200 and 250° C., until the water content of the pumice is lower than or equal to 10% by weight.

The next stage of the method consists in mixing the dried pumice with sludge issuing from the biological treatment of municipal or industrial wastewater until granules are obtained.

Biological treatment means one of the following treatments.

The most highly developed techniques in municipal and industrial wastewater treatment stations are intensive biological processes. The principle of these processes is to focus on small surfaces and intensify the conversion and destruction of organic matter that can be observed in the natural environment.

Three main types of process are employed:
bacterial beds and biological disks,
activated sludge,
biofiltration or accelerated biological filtration techniques.

Bacterial Bed

The operating principle of a bacterial bed consists in trickling the previously settled wastewater on a mass of porous or cavernous materials which serves to support the purifying microorganisms (bacteria). Aeration is carried out either by natural draft or by forced ventilation. The purpose is to provide the oxygen necessary to keep the aerobic bacteria in proper working order. The pollutant materials present in the water, and the oxygen, diffuse in countercurrent flow through the biological film to the assimilating microorganisms. The biological film comprises aerobic bacteria on the surface and aerobic bacteria near the bottom. The byproducts and carbon dioxide gas produced by the purification are removed in the liquid and gaseous fluids.

Biological Disks

Another technique using fixed cultures consists of rotating biological disks. The microorganisms develop thereon and form a purifying biological film on the disk surface. Since the disks are semi-immersed, their slow rotation permits the oxygenation of the fixed biomass.

Other fixed culture methods such as biofilters are also used.

Activated Sludge

The "activated sludge" process consists in mixing raw wastewater with liquid activated sludge, which is bacteriologically highly active. The aerobic degradation of the pollution takes place by intimate mixing of the purifying microorganisms and the effluent to be treated. The "purified water" and "purifying sludge" phases are then separated.

The three processes produce sludge that must be removed. These are the sludges which are used in the method.

The mixing of the sludge issuing from the biological treatment of municipal or industrial wastewater with pumice can take place using any common mixer particularly a ribbon mixer, a paddle, propeller, reverse screw mixer, etc. Good results have been obtained with a mixing time as short as 2 minutes.

As an improvement, the pumice and sludge are mixed at the same time with clay, at the rate of 5 to 12% by weight of the total mixture. This serves to eliminate unpleasant odors, particularly if the clay has a high cation exchange capacity.

It is also preferable to use a water retainer, particularly potassium polysilicate, at the rate of less than 1% by weight, in order to retain the water even better within the pores of the grains.

This produces a free-flowing granular material of which the largest dimension is between 0.1 and 15 mm, which can be packed in drums or bags at the mixer outlet and can be delivered and handled easily, especially since it is odorless.

This free-flowing granular material has a water content of 45 to 60%, an Si content of 22 to 25% expressed as $SiO_2$, an Al content of 6 to 9% expressed as $Al_2O_3$, a carbon content of 4 to 5% and an organic matter content as determined by loss on ignition of 1 to 3%. Other impurities or secondary elements in the form of traces, such as phosphorus, potassium, magnesium, calcium, may also be present.

The agronomic properties of the granular material according to the invention make it suitable as an organic soil improver in various types of agricultural (perennial crops, or commodity crops) and landscape (site remediation) uses. In soils that are vulnerable to drought, the material of the invention improves the planting of crops. Its use as a component of an above-ground crop support (substrate for cultures and containers in ornamental nurseries, for example) also yields good results.

The following example illustrates the invention.

One cubic meter or about 1 metric ton of sludge issuing from a biological municipal wastewater treatment station is used. The sludge has the following composition:

|  | Percentage (in g/100 g of raw sludge) | Analytical method |
| --- | --- | --- |
| Water | 89.3 | Drying by desiccators |
| Dry matter | 10.7 | NFU 44 171 |
| Organic matter | 7.9 | NFU 44 160 |
| Carbon | 3.9 | NFU 44 160 |
| Total nitrogen | 0.75 | Elemental analyzer |
| $N/NO_3$ | 0.0001 | Straight-run distillation |
| $N/NH_4$ | 0.12 | Griess method |
| $P_2O_5$ | 0.07 | Aqua regia ICP determination |
| $K_2O$ | 0.012 | Aqua regia |
| MgO | 0.009 | Water ICP determination |
| CaO | 0.0075 | Aqua regia ICP determination |
| Cl of chlorides | 0.01 | Dir 87/94 EEC 6 |

Pumice screened (0.5 to 15 mm), treated, purified and dried, was used. The pumice was first washed with water jets to separate the fines, magnetite and volcanic ash present in the pores. The pumice was then dried with hot air in a rotary oven provided with a gas burner in order to dry the pumice to 90% of its water content.

This pumice comprises:

Si (as $SiO_2$): 70%

Al (as $Al_2O_3$) 13%

Ti, Fe, Mg, Ca, Na, $K_2O$, $P_2O_5$, CaO, $SO_3$, $H_2O$: 17%

The cubic meter of sludge is mixed with 700 kg of pumice and clay with a high CEC (cation exchange capacity) plus 1 kg of water retainer.

The mixture is prepared in two minutes in a ribbon mixer with a capacity of 3000 liters.

The outlet product consists of grains that are still moist, but free-flowing and easily placed in bags or containers.

Starting with the cubic meter of sludge with a dryness of 11% (more or less liquid), a granular substrate is obtained for a volume of 1.2 m³.

This substrate, which has a grain size distribution of 0.5 to 15 mm, has the following composition:

|  | Percentage (in g/100 g of raw sludge) | Analytical method |
| --- | --- | --- |
| Water | 54 | Drying - desiccators |
| Si as $SiO_2$ | 41.20 | X rays |
| Organic matter | 3.0 | NFU 44 160 |
| Carbon | 1.48 | NFU 44 160 |
| Al as $Al_2O_3$ | 5.3 | X rays |
| Total nitrogen | 0.03 | Elemental analyzer |
| $N/NO_3$ | 0.0024 | Straight-run distillation |
| $N/NH_4$ | <0.004 | Griess method |
| $P_2O_5$ | <0.008 | Aqua regia ICP determination |
| $K_2O$ | 0.058 | Aqua regia |
| MgO | 0.16 | Water ICP determination |
| CaO | 0.64 | Aqua regia ICP determination |
| Cl of chlorides | <0.015 | Dir 87/94 EEC 6 |

NFU means French utilization standard.
ICP means assay by mass spectrometer.

The invention claimed is:

1. A method for producing a free-flowing granular material comprising the steps of providing a pumice having a size in the range of from about 500 mu to about 15 mm, mixing the pumice with water, separating the water from the pumice and drying the pumice to form dried pumice, combining one part by weight of sludge from a biological treatment of municipal or industrial waste water with from about 0.5 to about 0.9 part by weight of the dried pumice to form the free-flowing granular material comprising granules of the combined sludge and dried pumice.

2. The method of claim 1, further including the step of adding from about 5% to about 12% by weight of clay to the combined sludge and dried pumice based on the weight of the total mixture.

3. The method of claim 1, further including adding up to about 1% by weight of water retainer.

4. The method of claim 1, further including adding up to about 1% by weight of potassium polysilicate based on the weight of the total mixture.

5. The method of claim 1, wherein the step of mixing the pumice with water includes spraying waterjets through a screen on which the pumice is supported.

6. A method for producing a free-flowing granular material comprising the steps of providing a pumice having a size in the range of from about 500 mu to about 15 mm and a porous structure including pores, cleaning said pumice to remove debris contained in said pores, combining one part by weight of sludge from a biological treatment of municipal or industrial waste water with from about 0.5 to about 0.9 part by weight of the pumice to form the free-flowing granular material comprising granules of the combined sludge and dried pumice.

7. A granular free-flowing material having a maximum dimension between about 0.5 mm and 15 mm and the following elemental analysis by weight:

$H_2O$, 45% to 60%;

Si, expressed as $SiO_2$, 22% to 25%;

Al, expressed as $Al_2O_3$, 6% to 9%;

C, 4% to 5%; and

Organic matter (loss on ignition), 1% to 3%.

8. A method of forming a cultural substrate comprising the steps of providing a material in accordance with claim 6, depositing the material along a surface to form a cultural substrate.

* * * * *